(12) United States Patent
Shiao et al.

(10) Patent No.: US 11,053,684 B2
(45) Date of Patent: Jul. 6, 2021

(54) SOLAR HEAT-REFLECTIVE ROOFING GRANULES, SOLAR HEAT-REFLECTIVE SHINGLES AND PROCESS FOR PRODUCING THE SAME

(71) Applicant: CertainTeed LLC, Malvern, PA (US)

(72) Inventors: Ming Liang Shiao, Collegeville, PA (US); Tihana Tresler, Derry, NH (US); Husnu M. Kalkanoglu, Swarthmore, PA (US); Walter T. Stephens, Cleveland, OH (US)

(73) Assignee: CertainTeed Corporation, Malvern, PA (US)

( * ) Notice: Subject to any disclaimer, the term of this patent is extended or adjusted under 35 U.S.C. 154(b) by 0 days.

(21) Appl. No.: 16/394,963

(22) Filed: Apr. 25, 2019

(65) Prior Publication Data

US 2019/0249434 A1 Aug. 15, 2019

Related U.S. Application Data

(60) Continuation of application No. 14/247,761, filed on Apr. 8, 2014, now abandoned, which is a division of
(Continued)

(51) Int. Cl.
| | | |
|---|---|---|
| *C04B 35/64* | (2006.01) | |
| *C04B 33/04* | (2006.01) | |
| *E04D 1/20* | (2006.01) | |
| *C04B 33/32* | (2006.01) | |
| *C04B 35/10* | (2006.01) | |

(Continued)

(52) U.S. Cl.
CPC .............. *E04D 1/20* (2013.01); *C03C 10/00* (2013.01); *C04B 33/04* (2013.01); *C04B 33/32* (2013.01); *C04B 35/10* (2013.01); *C04B 35/18* (2013.01); *C04B 35/62695* (2013.01); *C04B 35/636* (2013.01); *C04B 35/64* (2013.01); *E04D 1/16* (2013.01); *C04B 2235/3217* (2013.01); *C04B 2235/349* (2013.01); *C04B 2235/528* (2013.01); *C04B 2235/5427* (2013.01); *C04B 2235/5436* (2013.01); *C04B 2235/5463* (2013.01); *C04B 2235/5472* (2013.01); *C04B 2235/5481* (2013.01); *C04B 2235/95* (2013.01); *C04B 2235/9646* (2013.01); *C04B 2235/9661* (2013.01); *E04D 2001/005* (2013.01); *Y02A 30/254* (2018.01); *Y02B 80/00* (2013.01);
(Continued)

(58) Field of Classification Search
None
See application file for complete search history.

(56) References Cited

U.S. PATENT DOCUMENTS 5,380,687 A * 1/1995 Mangold ................ B82Y 30/00
501/128
8,722,140 B2 * 5/2014 Shiao .................... C04B 35/636
427/186
(Continued)

*Primary Examiner* — Alexander M Weddle
(74) *Attorney, Agent, or Firm* — McDonnell Boehnen Hulbert & Berghoff LLP

(57) ABSTRACT

A process for preparing roofing granules includes forming kaolin clay into green granules and sintering the green granules at a temperature of at least 900 degrees Celsius to cure the green granules until the crystalline content of the sintered granules is at least ten percent as determined by x-ray diffraction.

20 Claims, 3 Drawing Sheets

Related U.S. Application Data application No. 12/886,721, filed on Sep. 21, 2010, now Pat. No. 8,722,140.

(60) Provisional application No. 61/244,627, filed on Sep. 22, 2009.

(51) Int. Cl.
*C04B 35/18* (2006.01)
*C04B 35/626* (2006.01)
*C04B 35/636* (2006.01)
*C03C 10/00* (2006.01)
*E04D 1/16* (2006.01)
*E04D 1/00* (2006.01)

(52) U.S. Cl.
CPC ............ *Y10T 428/24413* (2015.01); *Y10T 428/24421* (2015.01)

(56) References Cited

U.S. PATENT DOCUMENTS

| | | | | |
|---|---|---|---|---|
| 2004/0258835 A1* | 12/2004 | Hong | ............ | E04D 1/22 427/180 |
| 2007/0110961 A1* | 5/2007 | Fensel | ............ | E04D 5/12 428/143 |

* cited by examiner

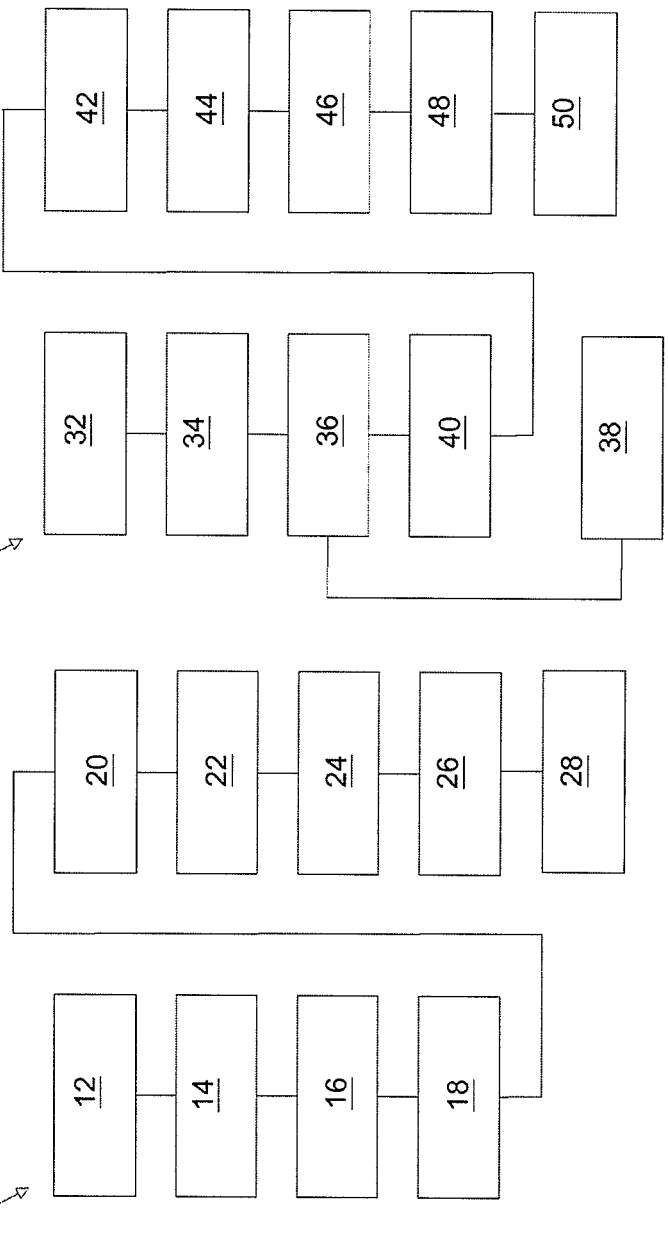

SOLAR HEAT-REFLECTIVE ROOFING GRANULES, SOLAR HEAT-REFLECTIVE SHINGLES AND PROCESS FOR PRODUCING THE SAME

CROSS-REFERENCE TO RELATED APPLICATION

This application is a continuation of U.S. patent application Ser. No. 14/247,761 filed Apr. 8, 2014, which is a divisional of U.S. patent application Ser. No. 12/886,721 filed Sep. 21, 2010, now U.S. Pat. No. 8,722,140 issued May 13, 2014, which claims the priority of U.S. Provisional Patent Application No. 61/244,627 filed Sep. 22, 2009, which are incorporated herein by reference in their entirety.

BACKGROUND OF THE INVENTION

1. Field of the Invention

The present invention relates to protective granules for asphalt roofing shingles, roofing shingles employing such granules, and processes for making such granules and shingles.

2. Brief Description of the Prior Art

Sized mineral rocks are commonly used as granules in roofing applications to provide protective functions to the asphalt shingles. Roofing granules are generally used in asphalt shingles or in roofing membranes to protect asphalt from harmful ultraviolet radiation. Roofing granules typically comprise crushed and screened mineral materials, which can be coated subsequently with a binder containing one or more coloring pigments, such as suitable metal oxides. The granules are employed to provide a protective layer on asphaltic roofing materials such as shingles, and to add aesthetic values to a roof.

Depending on location and climate, shingled roofs can experience very challenging environmental conditions, which tend to reduce the effective service life of such roofs. One significant environmental stress is the elevated temperature to which roofing shingles are subjected under sunny, summer conditions.

Mineral-surfaced asphalt shingles, such as those described in ASTM D0225 or D03462, are generally used in steep-sloped roofs to enhance the water-shedding function while adding aesthetically pleasing appearance to the roofs. The asphalt shingles are generally constructed from asphalt-saturated roofing felts and surfaced by pigmented color granules, such as those described in U.S. Pat. No. 4,717,614. Asphalt shingles coated with conventional roofing granules are known to have low solar heat reflectance, and hence will absorb solar heat, especially through the near infrared range (700 nm-2500 nm) of the solar spectrum. This phenomenon is increased as the granules covering the surface become dark in color. For example, while white-colored asphalt shingles can have solar reflectance in the range of 25-35%, dark-colored asphalt shingles can have solar reflectance of only 5-15%. Furthermore, except in the white or very light colors, there is typically only a very small amount of pigment in the color coating of the conventional granules that reflects solar radiation well. As a result, it is common to measure temperatures as high as 77° C. on the surface of black roofing shingles on a sunny day with 21° C. ambient temperature. Absorption of solar heat may result in elevated temperatures at the shingle's surroundings, which can contribute to the so-called "urban heat-island effect" and increase the cooling load to its surroundings. This not only increases the demand for indoor cooling energy, but also contributes to smog formation due to higher surface temperatures. Hence, it is beneficial to have a surface with increased solar reflectance, such as greater than 70 percent, to reduce solar heat gain, thereby reducing the heat flux entering the building envelope or reducing surface temperatures for lowering smog formation. It is therefore advantageous to have roofing shingles that have high solar reflectance.

The surface reflectivity of an asphalt shingle largely depends on the solar reflectance of the granules that are used to cover the bitumen. Typically, roofing granules are applied such that about 95 to 97 percent of the shingle surface is effectively covered by the granules.

The state of California has implemented a building code requiring the low-sloped roofs to have roof coverings with solar reflectance greater than 70%. However, colored roofing granules, prepared using current coloring technology, are not generally capable of achieving such a high level of solar reflectance. Thus, in order to reduce solar heat absorption, it has been suggested to apply coatings externally directly onto the shingled surface of roofs. White pigment-containing latex coatings have been proposed and evaluated by various manufacturers. However, the polymeric coating applied has only limited amount of service life and requires re-coat after certain years of service. Also, the cost of adding such a coating on roof coverings can be relatively high. Other manufactures have also proposed the use of exterior-grade coatings that were colored by IR-reflective pigments for deep-tone colors and sprayed onto the roof in the field. U.S. Pat. No. 7,238,408 discloses an asphalt-based roofing material comprising a mat saturated with asphalt coating and a top coating having a top surface layer that has a solar reflectance of at least 70% obtained by adding metal flakes or metal flakes coated with metal oxides or sulfides such as titanium dioxide or zinc sulfide. U.S. Pat. No. 6,933,007 discloses the use of novel granules with solar reflectance greater than 55% and hardness greater than 4 on Moh's scale to enhance the solar reflectivity of asphalt based roofing products.

Solar control films that contain either a thin layer of metal/metal oxides, or dielectric layers applied through vacuum deposition, have been commercially available for use in architectural glasses.

U.S. Pat. No. 7,273,634 discloses pulverizing recycled ceramic material such as furnace liner blocks to form a powder and granular ceramic material to be dispersed in an adhesive and used for coating roofing shingles.

Many materials have been proposed for use in protecting roofing from solar heat radiation, such as ceramic grog, recycled porcelain (U.S. Pat. No. 6,933,007, incorporated herein by reference), and white plastic chips. However, the previously proposed materials have limited use, and cannot satisfy all requirements for roofing materials.

There is a continuing need for roofing materials, and especially asphalt shingles, that have improved resistance to thermal stresses while providing an attractive appearance. In particular, there is a need for roofing granules that provide increased solar heat reflectance to reduce the solar absorption of the shingle. Hence, it would be advantageous to have a roofing product that has solar reflectance greater than 70%. It is further advantageous that such a product could be applied to other substrates, such as siding or paving, or can be constructed as part of the system exposed to solar radiation such that the solar heat gain can be reduced to mitigate the urban heat island effect.

SUMMARY OF THE INVENTION

The present invention provides synthetic roofing granules that provide increased solar heat reflectance, as well as a process for preparing such roofing granules, bituminous roofing products incorporating such roofing granules, and a process for preparing such roofing products. In one aspect, synthetic roofing granules according to the present invention comprise at least one sintered aluminosilicate having a crystalline content of at least ten percent, more preferably at least 70 percent, and still more preferably at least 90 percent. In one embodiment, the synthetic roofing granules comprise sintered bauxite; and in another embodiment, the synthetic roofing granules comprise sintered kaolin clay.

The present invention thus provides a process for preparing roofing granules. The process includes providing a ceramic-forming material comprising at least one aluminosilicate and forming the ceramic-forming material into green granules. The process further comprises sintering the green granules at a temperature of at least 900 degrees Celsius to cure the green granules until the crystalline content of the sintered granules is at least ten percent as determined by x-ray diffraction, and more preferably, at least about 90 percent. The conditions selected for sintering depend on the identity of the ceramic-forming material. In one aspect of the present invention, the ceramic-forming material is kaolin clay. In another aspect of the present invention, the ceramic-forming material is bauxite.

When the ceramic-forming material is kaolin clay, the green granules are preferably sintered at a temperature of at least 1450 degrees Celsius until the crystalline content of the granules is at least about 90 percent, and more preferably about 100 percent, as determined by x-ray diffraction. Preferably, when the ceramic-forming material is kaolin clay, the granules are sintered until the granules consist essentially of a mixture of at least one aluminosilicate, preferably mullite and/or sillimanite, crystoballite and quartz. In this case, ceramic-forming material can further include a mineral material, such as titanium dioxide.

When the ceramic-forming material is bauxite, the green granules are preferably sintered at a temperature of at least 1250 degrees Celsius until the crystalline content of the granules is at least about 10 percent, and more preferably about 70 percent, as determined by x-ray diffraction. Preferably, when the ceramic-forming material is bauxite, the granules are sintered until the granules consist essentially of a mixture of at least one aluminosilicate, preferably mullite and/or sillimanite, crystoballite, quartz and corundum. In this case, ceramic-forming material can further include a mineral material, preferably titanium dioxide.

Preferably, the amorphous material content of the sintered granules is greater than about five percent.

Preferably, the sintered granules contain less than three percent crystalline silica, more preferably, less than one percent crystalline silica.

In one presently preferred embodiment of the process of the present invention, the ceramic-forming material is mixed with a liquid to form a mixture, the mixture is formed into pellets, such as spherical pellets, and the pellets are screened to provide green granules having a predetermined initial particle-size distribution. The green granules are subsequently sintered to provide a mixture of sintered granules. In this embodiment, the process of the present invention can further include embedding sintered granules in a bituminous surface. Two or more lots of sintered granules having different predetermined initial particle-size distributions can be combined to provide a mixture of sintered granules having predetermined final particle-size distribution, such as a bimodal particle-size distribution. Preferably, the predetermined final particle-size distribution and the particle shape are selected to maximize coverage of the shingle surface by the sintered granules. Preferably, the predetermined final particle-size distribution is selected to provide at least 85 percent surface coverage when the sintered granules are embedded in a bituminous surface, more preferably at least 90 percent, and still more preferably at least 97 percent. The sintered granules can be embedded in the bituminous surface by applying a mixture of sintered granules having a predetermined particle-size distribution to the bituminous surface. Alternatively, two or more mixtures of sintered granules having different particle-size distributions can be applied successively or simultaneously to the bituminous surface. The present invention also provides roofing granules and bituminous roofing products prepared according to the process of the present embodiment.

In another aspect, the present invention provides a process for forming bituminous roofing products with high solar heat reflectance, comprising providing a ceramic-forming material comprising kaolin clay; forming the ceramic-forming material into green granules; and sintering the green granules at a temperature of at least 900 degrees Celsius until the crystalline content of the sintered granules is at least ten percent, as determined by x-ray diffraction. In this aspect, the process of the present invention further includes providing a bituminous roofing sheet material having an upper surface; and applying the sintered granules in the upper surface of a bituminous roofing sheet material. The process further preferably includes pressing the sintered granules into the upper surface of the bituminous roofing sheet to embed the sintered granules in the upper surface of the roofing material. In this aspect of the process of the present invention, the ceramic-forming material is formed into at least two different classes of green granules, each class of green granule being characterized by a predetermined average particle size prior to sintering the green granules, and the green granules are sintered to provide at least two size classes of sintered granules. In one presently preferred embodiment, the process further comprises blending sintered granules from at least two different size classes prior to applying the sintered granules to the upper surface of a bituminous sheet roofing material. In another presently preferred embodiment, the process includes sequentially applying at least two different classes of sintered granules to the upper surface of the bituminous sheet roofing material. In one presently preferred embodiment, the process further includes applying conventional colored roofing granules in the bituminous roofing sheet material. In another presently preferred embodiment the process further includes mixing the sintered granules with a liquid binder composition prior to applying the sintered granules to the upper surface of the bituminous roofing sheet material. In an alternative embodiment, the process further includes applying a liquid binder composition to the upper surface of the bituminous roofing sheet material after the sintered granules have been applied. In either case, the liquid binder composition is preferably selected from the group consisting of acrylic emulsions, acrylic solutions, thermoplastic polymers, fluoropolymer emulsions, epoxy resins, UV curable resins, radiation curable resins, alkaline metal silicates, sol-gel solutions, silicone resins, and silica binders. In this aspect, the present process also thus provides a bituminous roofing product.

In another presently preferred embodiment, the present invention provides a process for forming bituminous roofing products with high solar heat reflectance including providing a ceramic-forming material comprising at least one aluminosilicate, and providing base particles comprising material thermally stable up to a temperature of at least 900 degrees Celsius. The process further includes applying the ceramic-forming material to the base particles to form a green coating layer on the base particles to form green granules and sintering the green granules at a temperature of at least 900 degrees Celsius until the crystalline content of the coating layer of the granules is at least ten percent as determined by x-ray diffraction, more preferably at least 25 percent, still more preferably at least 50 percent, and most preferably about 100 percent. The process further preferably includes providing a bituminous roofing sheet material having an upper surface and applying the sintered granules in the upper surface of a bituminous roofing sheet material. Preferably, the process further comprises pressing the sintered granules into the upper surface of the bituminous roofing sheet to embed the sintered granules in the upper surface of the roofing sheet.

In one aspect, the ceramic-forming material is formed into at least two different classes of green granules, each class of green granule being characterized by a predetermined average particle size, prior to sintering the green granules. The green granules are sintered to provide at least two size classes of sintered granules. Preferably, the process further comprises blending sintered granules from at least two different size classes prior to applying the sintered granules in the upper surface of the bituminous sheet roofing material. In one aspect of the present process, at least two different classes of sintered granules are applied sequentially into the upper surface of the bituminous sheet-roofing material. In another aspect of the present process, the process further comprises applying conventional colored roofing granules in the bituminous roofing sheet.

In another aspect of the present invention, the sintered granules are mixed with a liquid binder composition prior to applying the sintered granules to the upper surface of the bituminous roofing sheet material. In an alternative aspect of the present invention, the process further comprises applying a liquid binder composition to the upper surface of the bituminous roofing sheet after the sintered granules have been applied. In either case, the liquid binder composition is preferably selected from the group consisting of acrylic emulsions, acrylic solutions, thermoplastic polymers, fluoropolymer emulsions, epoxy resins, UV curable resins, radiation curable resins, alkaline metal silicates, sol-gel solutions, silicone resins, and silica binders. In this embodiment, the process also preferably provides a bituminous roofing product.

In another embodiment, the present invention provides a process for forming bituminous roofing products with high solar heat reflectance including providing a ceramic-forming material comprising at least one aluminosilicate, forming the ceramic-forming material into green granules, and sintering the green granules at a temperature of at least 900 degrees Celsius until the crystalline content of the sintered granules is at least ten percent as determined by x-ray diffraction. In this embodiment, the process further includes providing a matrix material for securing the sintered granules, and forming a solar reflective sheet comprising sintered granules and matrix material. Preferably, the process further includes providing a bituminous roofing sheet material with an upper surface, and applying the solar reflective sheet to the upper surface of a bituminous roofing sheet material, to form a bituminous roofing product.

In yet another embodiment, the present invention provides a process for forming bituminous roofing products with high solar heat reflectance comprising providing a ceramic-forming material comprising at least one aluminosilicate, providing base particles comprising material thermally stable up to a temperature of at least 900 degrees Celsius, and applying the ceramic-forming material to the base particles to form a green coating layer on the base particles to form green granules. The process further comprises sintering the green granules at a temperature of at least 900 degrees Celsius until the crystalline content of the sintered granules is at least ten percent as determined by x-ray diffraction. The process also includes providing a matrix material for securing the sintered granules, and forming a solar reflective sheet comprising sintered granules and matrix material. The process further optionally includes providing a bituminous roofing sheet material having an upper surface, and applying the solar reflective sheet to the upper surface of a bituminous roofing sheet material, to form a bituminous roofing product.

In another aspect, the present invention provides a process for preparing roofing granules comprising providing base particles, providing a ceramic-forming material comprising at least one aluminosilicate, coating the base particles with a layer of ceramic-forming material to form green granules having an exterior layer, and sintering the green granules at a temperature of at least 900 degrees Celsius to cure the green granules until the crystalline content of the exterior layer of the sintered granules is at least ten percent as determined by x-ray diffraction. In one aspect of this process, the base particles preferably comprise a sintered ceramic material formed from at least one aluminosilicate. Thus, the present invention also provides roofing granules comprising a base particle, and an exterior coating on the base particle, the exterior coating comprising a sintered ceramic material formed from clay and having a crystalline content of at least ten percent as determined by x-ray diffraction. Preferably, in one aspect, the roofing granules have base particles comprising a sintered ceramic material formed from clay.

BRIEF DESCRIPTION OF THE DRAWINGS

FIG. 1 is a schematic illustration of a first embodiment of a process for preparing a bituminous roofing material with high solar heat resistance according to the process of the present invention.

FIG. 2 is a schematic illustration of a second embodiment of a process for preparing a bituminous roofing material with high solar heat resistance according to the process of the present invention.

DETAILED DESCRIPTION

Figure 3:
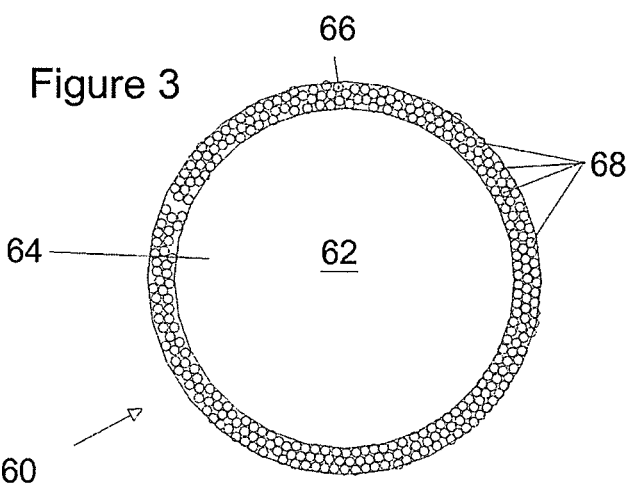
FIG. 3 is a schematic illustration of a roofing granule with high solar heat resistance according to the present invention.

The present invention provides mineral-surfaced roofing products, including bituminous roofing membranes and shingles, with high solar reflectance, such as greater than 70 percent, as well as excellent UV opacity to protect the underlying asphalt substrate, and excellent outdoor durability for its long-term usage, as well as good fire resistance and mechanical strength. The present invention also provides granular roofing materials that exhibit solar reflectance greater than about 73 percent.

Bituminous roofing membranes are frequently covered with a layer of mineral-based roofing granules in order to protect the underlying bituminous layer from degradative effects of UV radiation and to provide an attractive appearance. In addition, roofing granules can help reduce cooling loads by reflecting solar heat. Typically, the applied layer of roofing granules does not completely cover the bituminous surface. Approximately 3 to 5 percent of the surface remains exposed in bituminous roofing membranes produced by a typical manufacturing process. Thus, in order to provide roofing products with at least 70 percent solar reflectance, solar heat-reflective granules having a solar reflectance of greater than about 73 percent are required, such as are provided by the present invention.

As used in the present specification and claims, "near infrared-reflective" and "solar heat-reflective" refer to reflectance in the near infrared range (700 to 2500 nanometers) of the electromagnetic spectrum. "Visible" refers to the visible range of the electromagnetic spectrum (400 to 700 nm). "Ultraviolet" and "UV" refer to the ultraviolet range (10 to 400 nanometers) of the electromagnetic spectrum. As used in the present specification and claims, the "opacity" of an object or medium refers to the extinction of incident radiation by the object or medium and is the sum of the absorption of incident radiation and the scattering of incident radiation. As used in the present specification and claims, "about" means plus or minus three percent or less. As used in the present specification and claims, "encapsulate" means to cover completely, that is, to cover 100 percent of the surface.

As used in the present specification and claims, "granule coloring pigment" denotes a conventional metal oxide-type pigment employed to color roofing granules. As used in the present specification and claims, the strength in color space $E^*$ is defined as $E^*=(L^{*2}+a^{*2}+b^{*2})^{1/2}$, where $L^*$, $a^*$, and $b^*$ are the color measurements for a given sample using the 1976 CIE $L^*a^*b^*$ color space. The total color difference $\Delta E^*$ is defined as $\Delta E^*=(\Delta L^{*2}+\Delta a^{*2}+\Delta b^{*2})^{1/2}$ where $\Delta L^*$, $\Delta a^*$, and $\Delta b^*$ are respectively the differences in $L^*$, $a^*$ and $b^*$ for two different color measurements.

By "aluminosilicate" is meant a mineral comprising aluminum, silicon and oxygen, including: (a) aluminum silicates such as naturally occurring minerals such as adalusite, kyanite, and siimanite, having the composition $Al_2SiO_5$, (b) layered hydrous aluminum silicates such as kaolinite, $Al_2SI_2O_5(OH)_4$, halloysite $Al_2(Si_2O_5)(OH)_4.2H_2O$, pyrophyllite $Al_2(Si_2O_5)_2(OH)_2$, montmorilonite $(Al_{1.67}Na_{0.33}Mg_{0.33})(Si_2O_5)_2(OH)_2$, mica $AL_2K(Si_{1.5}Al_{0.5}O_5)_2(OH)_2$, and illite $Al_{2-x}Mg_xK(Si_{1.51}Al_{0.5+y}O_5)_2(OH)_2$; (c) clays including layered hydrous aluminum silicates such as kaolin clays; (d) bauxites including the minerals gibbsite $Al(OH)_3$, boehmite gamma-$AlO(OH)$, and/or diaspore alpha-$AlO(OH)$; and (e) feldspars such as orthoclase, $[(K, Na)AlSi_3O_8]_4$, albite $[NaAlSi_3O_8]_4$, and anorthite, $Ca[Al_2Si_2O_8]$.

By "kaolin clay" or "kaolin" is meant a material comprising kaolinite, quartz and feldspar. For use in the process of the present invention, it is preferred that kaolin clay have a kaolinite content of at least about 80 weight percent, more preferably at least about 90 weight percent, and still more preferably at least about 95 weight percent.

By the "sphericity" of a three-dimensional particle is meant the ratio of particle volume to that of the smallest circumscribing sphere.

By "spherical" particle is meant a particle having an average ratio of minimum dimension to maximum dimension of 0.7 or greater, or having an average sphericity value (ratio of the surface area of a sphere (with the same volume as the given particle) to the surface area of the particle) of about 0.7 or greater.

By "sintering" is meant a method for making objects from powdered material, by heating the material from below its melting point (solid state sintering) until the particles adhere to each other.

By "calcining" is meant heating a solid material such as an ore to a temperature below the melting point and sintering point of the solid material in order to bring about a thermal decomposition, phase transition, or removal of a volatile fraction.

By "mesh size" is meant ASTM U.S. Standard mesh size unless otherwise indicated.

By "crystalline content" is meant the proportion, on a weight basis, of anhydrous crystalline material, as opposed to crystalline material including physically adsorbed and/or chemically bound water, as determined by x-ray diffraction. Thus, crystalline materials, such as kaolinite, gibbsite, bohemite, etc., which include physically adsorbed and/or chemically bound water, are excluded, and crystalline materials which do not include physically adsorbed or chemically bound water, such as mullite and corundum, are included.

Unless otherwise stated, "percent" or "percentage" refers to the percent by weight.

By "granule surface coverage" is meant the percent of roof membrane surface area covered by roofing granules as measured using image analysis software, such as Image-Pro Plus from Media Cybernetics, Inc., Silver Spring, Md. 20910. The shingle surface area is recorded as a black and white image using a CCD camera fitted to a microscope. The image is then separated into an asphalt-coating portion and a granule covering portion using the threshold method in gray scale. The amount of granule coverage is then calculated by the image analysis software based upon the number of pixels with gray scale above the threshold level divided by the total number of pixels in the image.

By "solar reflectivity" and "solar heat reflectance" is meant the quantity measured by a solar spectrum reflectometer (Model SSR available from Devices and Services Inc., Dallas, Tex.), unless otherwise indicated.

Preferably, the present invention provides highly solar heat-reflective, solid, durable, and crush-resistant materials suitable for roofing applications including particles with sizes ranging from −12 U.S. mesh to +50 U.S. mesh and granules with sizes ranging from −10 to +40 U.S. mesh.

Referring now to the drawings, in which like reference numerals refer to like elements in each of the several views, there are shown in FIG. 1 a schematic illustration of a first embodiment of a process 10 for preparing a bituminous roofing material with high solar heat resistance according to the process of the present invention. An aluminosilicate such as a Tertiary or Cretaceous kaolin clay is subjected to a series of conventional operations 12 to beneficiate the clay, including blunging, degritting, classifying, magnetically separating, flocculating, filtrating, redispersing, spray drying, pulverizing and calcining. Subsequently, the beneficiated clay is mixed 14 with a suitable binder, such as polyvinyl alcohol, and the mixture is delivered to an intensive mixer, such as an Eirich mixer, where the binder and clay mixture is formed 16 into generally spherical "green" or uncured granules or particles. The resulting green granules or particles are then dried 18 and then classified 20 by dropping them through a series of screens of varying mesh sizes. The classified green granules are then sintered 22 by heating them in a suitable kiln or oven at a temperature of at least about 900 degrees Celsius so that a crystalline phase having high solar heat reflectance formed. The classified sintered granules are then mixed 24 to form a blend of a desired particle-size distribution, such as a particle-size distribution tending to maximize surface coverage when the blend is applied to the upper surface of a bituminous sheet roofing product. The sintered granule blend is then applied 26 to the heat-softened upper surface of a bituminous roofing sheet product by conventional means, such as dropping at a metered application rate from an overhead hopper. Subsequently, the granules are pressed 28 into the upper surface of the bituminous roofing sheet product using a pressure roll. The bituminous roofing sheet product is then cooled and cut into roofing shingles, which are subsequently packaged.

FIG. 2 is a schematic illustration of a second embodiment of a process 30 for preparing a bituminous roofing material with high solar heat resistance according to the present invention. An aluminosilicate such as kaolin clay is subjected to a series of beneficiating operations 32 to form a dried, calcined powder. Subsequently, the beneficiated clay is mixed 34 with a suitable binder, such as starches such as potato starch, synthetic binders such as polyvinyl alcohol or liquid binders such as AR animal glue, to form a coating composition. The coating composition is applied 36 to crushed, classified stone particles in a suitable mixing apparatus to form a green coating on the granules. The coating operation is repeated using at least two batches stone particles having different average particle sizes to yield classified green granules. The stone particles can be classified 38 by dropping them through screens of differing mesh sizes. The resulting green granules or particles are then dried 40. The classified green granules are then sintered 42 by heating them in a suitable kiln or oven at a temperature of at least about 900 degrees Celsius so that a crystalline phase having high solar heat reflectance is formed. The classified sintered granules are then mixed 44 to form a blend having a desired particle-size distribution, such as a particle-size distribution tending to maximize surface coverage when the blend is applied to the upper surface of a bituminous roofing sheet product. The sintered granule blend is then applied 46 to the heat-softened upper surface of a bituminous roofing sheet product by conventional means, such as dropping at a metered application rate from an overhead hopper. Subsequently, the granules are pressed 48 into the upper surface of the bituminous roofing sheet product using a pressure roll. The bituminous roofing sheet product is then cooled, and cut 50 into roofing shingles, which are subsequently packaged.

FIG. 3 is a schematic side sectional view of a roofing granule produced according to the process of FIG. 2. The granule 60 includes an interior core 62 of a stone dust particle 64. The interior core 62 is covered with an exterior layer 66 of sintered kaolin particles 68. The sintered kaolin particles 66 largely comprise mullite with a small amount of crystoballite, and have high crystallinity as determined by x-ray diffraction and concomitant solar heat reflectance.

The highly solar heat-reflective materials of the present invention are preferably prepared by heating suitably sized ceramic-forming material comprising at least one aluminosilicate such as kaolin clay at temperatures from 900 degrees Celsius to 1450 degrees Celsius. The at least one aluminosilicate is preferably sintered at the elevated temperature, and the crystalline content, as determined by x-ray diffraction, increases from about ten percent, when the ceramic-forming material is sintered at 900 degrees Celsius, to about 100 percent, when the ceramic-forming material is sintered at 1450 degrees Celsius. While not intending to be bound by any particular theory, it is believed that when the at least one aluminosilicate is kaolin clay, the kaolin clay undergoes an almost linear thermal expansion as it is heated up to about 600 degrees Celsius, at which point the volume declines due to dehydration. At about 900 degrees Celsius a phase transition to an intermediate spinel crystalline phase is believed to occur. At about 1200 degrees Celsius, it is believed that a further phase transition begins to occur, with the intermediate spinel phase being transformed into a crystalline mullite phase and a glassy silica phase or crystalline cristobalite phase, depending on the rate at which the material is being heated, to yield a completely sintered material at about 1500 degrees Celsius. Preferably, the ceramic-forming material is heated at a rate favoring the formation of the crystalline cristobalite phase. For example, a heating rate of less than about 20 degrees Celsius per minute is preferred.

The aluminosilicate preferably used in the process of the present invention can be a clay material such as a kaolin clay. The kaolin clay preferably used in the process of the present invention can be a kaolin crude material, including kaolin particles, oversize material, and ferruginous and/or titaniferous and/or other impurities, having particles ranging in size from submicron to greater than 20 micrometers in size. Alternatively, a refined grade of kaolin clay can be employed, such as, for example, a grade of kaolin clay including mechanically delaminated kaolin particles. Further, grades of kaolin such as those coarse grades used to extend and fill paper pulp and those refined grades used to coat paper can be employed in the process of the present invention.

In addition to the at least one aluminosilicate such as kaolin clay, the ceramic-forming material can include small amounts of other minerals. For example, the ceramic-forming material can include small amounts of other minerals selected to further increase the solar heat reflectance of the sintered ceramic-forming material. In particular, small amounts of microcrystalline silica, such as novaculite, can be mixed with kaolin clay to form the ceramic-forming material. By "small amounts" is meant less than about five percent by weight. Further, small amounts of titanium dioxide can be mixed with kaolin clay to form the ceramic-forming material, although the presence of titanium dioxide in the sintered ceramic-forming material is not essential to achieving high solar heat-reflectance. Small amounts of titanium dioxide are also present in some kaolin clays as mined. Preferably, the ceramic-forming material includes less than three percent crystalline silica, more preferably, less than one percent crystalline silica. Processes which can be used or adapted for use in preparing the synthetic roofing granules of the present invention include processes for preparing synthetic proppant materials, such as processes for preparing high strength proppants from clay, and mixtures of clay with other materials, such as disclosed, for example, in U.S. Pat. Nos. 4,251,265, 4,668,645, 4,555,493, 4,921,820, 5,120,455, and 7,036,591, each of which is incorporated herein by reference. Other useful processes include processes for producing high strength proppants from bauxite, such as are disclosed, for example, in U.S. Pat. Nos. 4,440, 866, 4,639,427, 4,712,203, 4,879,181, 5,175,133, each of which is incorporated herein by reference. Still other useful processes include processes for preparing high strength proppants from composite materials, such as disclosed, for example, in U.S. Pat. Nos. 4,944,905, 6,753,299, 6,983,797, and 7,678,723, each of which is incorporated herein by reference.

Highly solar heat-reflective materials of the present invention can be prepared by the processes disclosed in U.S. Pat. No. 6,780,804, incorporated herein by reference.

The ceramic-forming material comprises at least one aluminosilicate, and can include uncalcined, partially calcined, or calcined clay, preferably kaolin clay. Examples of other ceramic-forming materials that can be employed in the process of the present invention include bauxite clays, including low iron bauxites, kaolinitic clays such as china clays, ball clays, fireclays, and flint clays, Dover clay, bauxite clays, diaspore clay, burley clay, mixtures thereof, and mixtures thereof with kaolin clay. Further, kaolin clay blended with other aluminosilicate species can also be employed. For example, blends of kaolin clay and bauxite can be used. Kaolinitic clays are preferred. Examples of ceramic-forming materials that can be used include sillimanite minerals (63% $Al_2O_3$ and 37% $SiO_2$) which form ceramics having similar composition, as well as bauxite, preferably, bauxite having a low level of iron oxide or hematite. Clays employed in the present process can be beneficiated by flotation, selective flocculation, magnetic separation, degritting, delamination, leaching, and like processes. Further, mixtures of one or more aluminosilicates and other mineral species such as nepheline syenite can be employed.

Preferably, the at least one aluminosilicate, ceramic-forming material, provides a ceramic having a composition of from about nine parts by weight $Al_2O_3$ to one part by weight $SiO_2$ to about one part by weight $Al_2O_3$ to nine parts by weight $SiO_2$. In addition, the at least one aluminosilicate, ceramic-forming material, can include $Fe_2O_3$ such that the resulting ceramic includes up to about ten percent by weight $Fe_2O_3$. Preferably, however, the iron oxide content of the resulting ceramic is less than three percent by weight.

Preferably, the at least one aluminosilicate, ceramic-forming material, is selected so that the roofing granules produced by the process of the present invention have an alumina content of greater than 50 percent, an amorphous material content of greater than five percent, and a crystalline silica content of less than three percent, more preferably, less than one percent.

The at least one aluminosilicate, ceramic-forming material, can also include a small amount of one or more mineral materials that act as sinter aids or fluxes during the sintering process. Thus, the ceramic-forming material can include one or more sintering aids such as bentonite clay, iron oxide, boron, boron carbide, aluminum diboride, boron nitride, boron phosphide, other boron compounds, and/or fluxes, such as sodium carbonate, lithium carbonate, feldspar, manganese oxide, titania, iron oxide, or sodium silicates.

In one presently preferred embodiment of the present invention, a starting material comprising particles of the at least one aluminosilicate, ceramic-forming material, are agglomerated into green granules. The green granules are subsequently sintered to provide roofing granules. If desired, a binder such as a starch, a resin, a wax, gelatinized cornstarch, calcium carbonate, polyvinyl alcohol, or combination thereof, can be added to improve pelletizing and to increase the green strength of the unsintered granules. Generally the binder is added at about 0-6% by weight, based on the weight of ceramic-forming material.

The starting material is preferably ground, such as by ball milling or another attrition process, to form particles having a mean size of about 20 microns or less, more preferably about 15 microns or less, most preferably, about 10 microns or less, expressed in terms of the particle diameter (or average particle size, where the particles are non-spherical). Depending on the attrition process employed, the starting material can be dried to improve the ease of grinding, if desired.

If desired, a binder for example, a starch, resin or wax, such as gelatinized cornstarch, calcium carbonate, polyvinyl alcohol, or combination thereof, may be added to the ground starting material mixture to improve pelletizing and to increase the green strength of the unsintered granules.

In a presently preferred embodiment of the process of the present invention, the ground starting materials are combined with a liquid, such as water, and mixed in an intensive mixer having a rotatable containment vessel provided with a rotor table and a rotatable impacting impeller, such as an Eirich mixer. The rotor table, or pan, rotates in an opposite direction to the impacting impeller. The impacting impeller may be in the form of a disk with rods or bars attached to the disk and aligned generally parallel with the axis of rotation of the impeller. Sufficient liquid is added to cause essentially spherical granules of the mixture to form. Generally, about 15-40 wt. percent liquid based on the weight of starting materials is added. After such granules have formed, from about 0-25 percent, more typically, from about 5 to about 15 wt. percent of additional starting material, which is preferably, the same dry starting material as is used to form the wet mixture, is added to the mixture. Addition of this dry powder stops the granule growth and completes the mixing operation.

Although an intensive mixer can be used to produce green granules, other forming methods can also be used. For example, a slurry of the starting material in water may be sprayed to form the granules. Spray-drying apparatus and techniques which can be employed in the process of the present invention are disclosed, for example, in U.S. Patent Publication 2009/0008805 A1, U.S. Pat. No. 7,067,445, and U.S. 7,387,752, each of which is incorporated herein by reference, and in *Spray Dryers: A Guide to Performance Evaluation* (2d Ed. American Institute of Chemical Engineers 2004).

Examples of spray-drying techniques that can be employed include atomizing a ceramic fluid feedstock into a spray of droplets, which become dried on contact with hot air. For example, a slurry of ceramic starting material, such as a mixture of aluminosilicates which may be calcined, partially calcined, or uncalcined, and water, and optionally other component such as binder material, for example, a starch such as potato starch, polyvinyl alcohol, methylcellulose, dextrin, or the like, and/or dispersants such as colloidal dispersants, polyelectrolyte dispersants, pyrophosphates and the like, and/or rheology control agents, is prepared. The slurry can have a high solids content, that is, greater than fifty percent by weight. The slurry is pumped through a pressure nozzle, rotary wheel atomizer, pressurized dual fluid nozzle, or other suitable device, to atomize the slurry into droplets, which contact hot air while falling through a drying chamber, to form dried green particles. The dried green particles can then be sintered using a suitable sintering furnace.

Further, while an intensive mixer can be used to produce spherical green granules, forming methods which provide other granule geometries (for example ellipsoidal or cylindrical) can also be employed.

Granules produced according to the process of the present invention preferably have a particle size of from −0.8 to −0.9 on the Krumbein scale.

Preferably, the granule geometry is selected to maximize coverage of the bituminous roofing surface in which the granules are embedded. In particular, granules having a flat or plate-like geometry are preferred.

Multiple-size classes of granules can be used to maximize coverage.

The resulting green granules are then dried to a moisture content of less than about 10 weight percent, usually in a drier at between about 100 degrees C. and about 300 degrees C. The dried, green granules thus formed are thereafter sintered in a furnace at a predetermined sintering temperature to provide highly solar heat-reflective roofing granules.

The green granules can be screened for size, preferably after drying. An initial screening of the green granules can be carried out after drying, but prior to sintering. For example, a top screen having a mesh size of about 14 or 16 mesh can be used to screen out the largest particles, and a bottom screen having a mesh size of about 28, 30, or 32 is used to remove the finer particles. The choice of top and bottom screens depends, in part, on the mixture produced by the mixer and can be adjusted to tailor the median particle size of the mixture. The rejected oversized and undersized granules may be recycled. A further screening may take place after sintering.

Generally, suitable sintering temperatures are generally about 1200 degrees Celsius and above, more preferably, above about 1300 degrees Celsius, and most preferably, about 1500 degrees Celsius. Dried green granules consisting of kaolin clay are preferably sintered at a temperature of at least 900 degrees Celsius, and preferably between 900 degrees Celsius and about 1450 degrees Celsius, to cure the green granules until the crystalline content of the sintered granules is at least 10 percent, more preferably at least 25 percent, still more preferably at least 50 percent, and most preferably about 100 percent, as determined by x-ray diffraction.

Sintering results in a change in specific gravity and volume of the granules. Preferably, the green granules are sintered until a specific gravity between about 2.1 and 4.2 g/cc is obtained, depending on the composition of the ceramic-forming mixture being sintered, and the desired specific gravity of the roofing granules. For granules formed consisting essentially of kaolin clay, which comprises about 46 percent by weight $Al_2O_3$ and about 54 percent by weight $SiO_2$, the specific gravity after sintering is preferably from about 2.2 to 2.9 g/cc. In general, the specific gravity after sintering ranges from about 2.2 to 4.2 g/cc, depending on the composition of the ceramic-forming material. Sintering generally causes a reduction of up to about 20% in granule size as well as an increase in specific gravity of the granule.

The finished granules can be spherical (i.e., have an average sphericity value of about 0.75 or greater, more preferably, at least 0.80, and typically, 0.80-0.9). The particle size of the sintered and screened granules is generally between 0.1 and about 2.5 millimeters. The screen sizes can be selected to provide a granule mixture with a desired, predetermined particle-size distribution.

Preferably, the particle-size distribution of the granules is selected to maximize coverage, and hence protection, of the bituminous surface in which the granules are embedded. For example, the granules can be screened to provide at least 85 percent, more preferably at least 95 percent, and still more preferably at least 97 percent surface coverage, when the roofing granules are embedded in a bituminous surface. In order to maximize surface coverage, a bimodal particle-size distribution can be selected. For example, a first batch of granules having an average particle size of −16/+18 mesh can be prepared, and a second batch of granules having an average particle size of −35/+40 mesh can be prepared. A granule mixture can then be prepared by mixing 94 wt. percent of the first batch of granules with 6 wt. percent of the second batch of granules. When a bimodal particle-size distribution is selected, it is preferred that the ratio of the two maxima in the particle-size distribution be selected to maximize coverage of the bituminous surface such that the smaller particles tend to fill the interstices between the larger particles. Thus, the ratio of the maxima of the smaller size granules to the maxima of the larger size granules is preferably between about 0.22 and 0.5, which is alternatively expressed as the ratio of the maxima of the larger size granules to the smaller size granules of about 4.5 to 2.

In this embodiment, the process of the present invention further includes providing a bituminous roofing sheet material having an upper surface. The preparation of bituminous roofing sheet material is well known in the art. Typically, bituminous roofing sheet material comprises a reinforcing web of a fibrous material, such as for example glass fibers. The reinforcing web is typically impregnated with a bituminous material at an elevated temperature and in addition may be coated on one or both sides with a bituminous material having the same or different composition as than used to impregnate the web. The sintered granules can be applied to the upper surface of the bituminous roofing sheet material, preferably while the bituminous material is sufficiently soft and deformable (for example, when the temperature of the bituminous material is greater than about 300 degrees Fahrenheit, or about 150 degrees Celsius) so that the sintered granules will strongly adhere to the bituminous material on cooling. If desired, the sintered granules can be pressed into the upper surface of the bituminous roofing sheet material in order to securely embed the sintered granules in the upper surface of the bituminous roofing sheet material. The surface of the kaolin granules can be treated with an adhesion promoter, a silicone emulsion, or a mineral oil to improve the adhesion of the kaolin granules to the bituminous roofing sheet material.

In one aspect of the process of the present invention, the ceramic-forming material is formed into at least two different classes of green granules, each class of green granule being characterized by a predetermined average particle size, prior to sintering the green granules, and the green granules are sintered to provide at least two size classes of sintered granules. For example, a first class of granules having a #22 grading (that is, a class of granules having particle size greater than 70 U.S. mesh and less than 14 U.S. mesh) can be blended with a second class of granules having a #28 grading (that is, a class of granules having particle size greater than 70 U.S. mesh and less than 18 U.S. mesh) in a weight ratio of 10 percent to 90 percent. Subsequently, the at least two different classes of sintered granules can be applied sequentially into the upper surface of the bituminous sheet roofing material; for example, by being dropped from separate hoppers unto the upper surface of the bituminous roofing sheet material. For example, when only two classes of granules are prepared, the larger of the two classes of granules can be applied first, and the smaller of the two classes of granules can be applied subsequently to fill the interstices between the larger granules. The first class of granules can be optionally pressed into the upper surface of the bituminous roofing sheet material before the second class of granules is applied. Alternatively, the granules can be pressed into the upper surface of the bituminous roofing sheet material after both classes of granules have been applied. In another alternative, the smaller of the two classes of granules can be applied first, and the larger of the two classes of particles can be applied subsequently. In this case also, the first (smaller) class of granules can be optionally pressed into the upper surface of the bituminous roofing sheet material before the second (larger) class of granules is applied. Preferably, the second class of granule is pressed into the upper surface of the bituminous roofing sheet material in this alternative. In another aspect of the process of the present invention, two or more size classes of granules having different average particle sizes are mixed together to form a granule mixture, and the granule mixture is applied to the upper surface of a bituminous roofing sheet material. The two classes of granules can be blended, for example, by using a vibratory feed or in a slate drum, and the blended granules can then be dropped onto the upper surface of the bituminous roofing sheet material. The granules are then preferably pressed into the upper surface of the bituminous roofing sheet material.

Highly solar heat-reflective roofing granules useful in the process of the present invention for preparing roofing bituminous roofing products are available from Saint-Gobain Proppants as Versaprop, Interprop, and Ultraprop sintered bauxite granules.

In another aspect of the process of the present invention, highly solar heat-reflective roofing granules are employed with other types of roofing granules, such as conventionally colored roofing granules to enhance the solar reflectance of colored bituminous roofing sheet materials, and/or with algae resistant roofing granules, in order to provide resistance to algae growth on the roofing surface.

Roofing granules are conventionally colored using metal oxide coating pigments. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. Further examples of coatings pigments that can be used include white titanium dioxide pigments provided by Du Pont de Nemours, P.O. Box 8070, Wilmington, Del. 19880. Such metal oxide pigments are typically dispersed in a binder comprising a mixture of an alkali metal silicate, such as aqueous sodium silicate, and heat reactive aluminosilicate material, such as clay, preferably, kaolin. The proportion of alkali metal silicate to heat-reactive aluminosilicate material is preferably from about 3:1 to about 1:3 parts by weight alkali metal silicate to parts by weight heat-reactive aluminosilicate material, more preferably about 2:1 to about 0.8:1 parts by weight alkali metal silicate to parts by weight heat-reactive aluminosilicate material. Such conventional granules are fired at an elevated temperature, such as at least about 200 degrees Celsius, and preferably about 250 to 500 degrees Celsius. At the elevated temperature the clay reacts with and neutralizes the alkali metal silicate, thereby insolubilizing the binder. The binder resulting from this clay-silicate process, believed to be a sodium aluminum silicate, is porous, such as disclosed in U.S. Pat. No. 2,379,358 (incorporated herein by reference). The alkali metal silicate can be aqueous sodium silicate solution having a total solids content of from about 38 percent by weight to about 42 percent by weight, and having a ratio of $Na_2O$ to $SiO_2$ of from about 1:2 to about 1:3.25.

Conventionally colored roofing granules can be mixed with highly solar heat-reflective roofing granules prepared according to process of the present invention, and the mixture can be applied to the upper surface of a bituminous roofing sheet product. Alternatively, the conventionally colored roofing granules and the highly solar heat-reflective roofing granules can be applied sequentially to the upper surface of a bituminous roofing sheet product. For example, conventional colored roofing granules can be applied first to the upper surface of a bituminous roofing sheet material followed by application of the highly solar heat-reflective roofing granules of the present invention.

Thus, in one aspect of the present invention, the solar reflectance of conventional roofing granules is enhanced by mixing the highly solar heat-reflective granules of the present invention with conventional roofing granules. The proportion of highly solar heat-reflective granules to conventional factors can be adjusted depending on a number of factors, such as the desired appearance of the resulting mixture, and the desired level of enhancement of solar reflectance for the mixture. Preferably, the weight ratio of highly solar heat-reflective granules to conventional granules is at least 1 to 9, more preferably at least 1 to 4, and still more preferably 1 to 3.

In addition to applying the sintered, highly solar heat-reflective granules according to the present invention directly to the upper surface of a bituminous roofing sheet material, other methods can be employed to enhance the solar heat reflectance of bituminous roofing sheet material with the sintered, highly solar heat-reflective granules of the present invention.

For example, in another embodiment of the present invention, sintered, highly solar heat-reflective, granules according to the present invention are mixed with a liquid binder composition prior to applying the sintered granules to the upper surface of the bituminous roofing sheet material. The mixture of the granules and liquid binder can be applied to the surface of the bituminous roofing sheet material using various techniques such as roller application, roll coating, form application, spraying, flood coating, etc. The liquid binder composition can be selected to provide adhesion between the granules and the upper surface of the bituminous roofing sheet material. In the alternative, a liquid binder composition can be first applied to the upper surface of the bituminous roofing sheet material to adhere the sintered granules to the upper surface of the bituminous roofing sheet material, and the sintered granules can be subsequently applied. In another alternative, the sintered granules can be first applied to the upper surface of the bituminous roofing sheet material, and a liquid binder composition can be subsequently applied to adhere the sintered granules to the upper surface of the bituminous roofing sheet material. The binder composition can be subsequently dried and/or cured on the surface of the bituminous roofing sheet material by application of heat, ultrasonic energy, UV radiation or the like, depending on the composition and functionality of the liquid binder composition.

Suitable liquid binder compositions include acrylic emulsions, latex, thermoplastic polymers, fluoropolymer emulsions, epoxies, UV or radiation curable resins, alkaline metal silicates, sol-gel solutions, silicone resins, and silica binders.

In another aspect of the present invention, the sintered, highly solar heat-reflective granules or particles can be dispersed in a suitable matrix material to form a sheet or web, and the resultant integrated sheet can be laminated onto a roofing substrate or adhere to an asphaltic substrate, such as a bituminous roofing sheet material. A tie layer can be employed to enhance the adhesion of the granule-containing sheet to the substrate. Suitable matrix materials may include, but not limited to, those liquid binders such as acrylic emulsions, latex, thermoplastic polymers, fluoropolymer emulsions, epoxies, UV or radiation curable resins, alkaline metal silicates, sol-gel solutions, silicone resins, and silica binders as mentioned above, as well as EPDM, thermoplastic elastomers, PVC, PVDF, polyolefins, and combinations thereof.

In yet another aspect, the present invention provides a process for forming bituminous roofing products with high solar heat resistance comprising providing a ceramic-forming material including at least one aluminosilicate, such as kaolin clay, and base particles comprising material thermally stable up to a temperature of at least 900 degrees Celsius, and applying the ceramic-forming material to the base particles to form green granules. The at least one aluminosilicate, such as kaolin clay, can be combined with a suitable binder, additives, or fillers to form a coating composition with suitable consistency and subsequently applied to the surface of the base particles. The aluminosilicate coating composition can be applied by various methods such as pan coating, spray coating, dip coating, shear mixing, fluidized bed coating, or spin coating to form a green or uncured coating layer on the base particles to form "green" granules. Preferably, the aluminosilicate coating composition is sufficiently thick to provide effective solar heat-reflectance, and more particularly, the aluminosilicate coating composition is preferably applied to form a layer of from about 1 micrometer to 300 micrometers in thickness on the base particles. The resultant green granules are then sintered at a temperature of at least 900 degrees Celsius until the crystalline content of the coating layer on the base particles is at least ten percent as determined by x-ray diffraction, more preferably at least 25 percent, still more preferably at least 50 percent, and most preferably about 100 percent. The green granules can be sintered in a rotary kiln or the like, such that the desired solar heat reflectance is obtained. After sintering, the thickness of the sintered solar heat-reflective coating is from about 0.5 micrometer to 250 micrometers. The resultant sintered, layered, highly solar heat-reflective granules can be classified as discussed above to provide a suitable average particle size and particle-size distribution. For example, the aluminosilicate, ceramic-forming material can be formed into at least two different classes of green granules by selecting two different classes of base particles, each having a different average particle size. The ceramic-forming material can then be applied to form a green layer on each of the classes of base particle to form two classes of green granules, each class of green granule being characterized by a predetermined average particle size, prior to sintering the green granules. The green granules can then be sintered to provide at least two size classes of sintered granules. The two classes of sintered granules can then be blended, and the blended sintered granules can be applied to the upper surface of a bituminous roofing sheet material, and optionally pressed into the upper surface of the bituminous roofing sheet material in order to embed the sintered granules in the upper surface of the bituminous roofing sheet material, or each class of sintered granule can be applied sequentially to the upper surface of the bituminous roofing sheet material. Further, conventional colored roofing granules can be applied to the bituminous roofing sheet material, either as a blend with the sintered, layered, highly solar heat-reflective granules of the present invention, or either before of after the sintered, layered, highly solar heat-reflective granules are applied. Similarly, the sintered, layered highly solar heat-reflective granules can be mixed with a suitable matrix material to form a sheet or web, and the resultant integrated sheet can be laminated onto a roofing substrate or adhere to an asphaltic substrate, such as a bituminous roofing sheet material, as discussed above. Further, the sintered, layered, highly solar heat-reflective granules can mixed with a liquid binder composition prior to applying the sintered granules to the upper surface of the bituminous roofing sheet material and then applied to the surface of the bituminous roofing sheet material using various techniques such as roller application, roll coating, form application, spraying, flood coating, etc. such as discussed above.

Various types of stone dust can be employed in the process of the present invention to prepare base particles. Stone dust is a natural aggregate produced as a by-product of quarrying, stone crushing, machining operations, and similar operations. The base particles can be mineral particles of the type typically used for making roofing granules, such as talc, slag, limestone, granite, syenite, diabase, greystone, slate, trap rock, basalt, greenstone, andesite, porphyry, rhyolite, and greystone, or other naturally occurring metamorphic rocks, crushed ceramic particles, sands, gravels, or any particles which are both UV opaque and thermally stable at temperatures greater than 900 degrees Celsius. Mineral particles of the type typically used for making roofing granules, while providing good resistance to UV radiation, generally have low solar heat reflectance, that is, low reflectance of near infrared radiation. The base particles can be prepared by comminuting and screening the material to provide an average size suitable for roofing granules. Preferably, the base particles have an average particle size from about 0.1 mm to about 2 mm, preferably about 0.4 mm to about 1.5 mm.

Alternatively, suitable base particles can be prepared by comminuting suitable minerals to an average size less than that suitable for use in roofing granules to thus form small particles, and subsequently agglomerating these small particles to form base particles. Base particle binder can be included to provide mechanical strength to the agglomerated particles forming base particles. The base particle binder is preferably selected from the group consisting of silicate, silica, phosphate, titanate, zirconate, and aluminate binders, and mixtures thereof. In one aspect, the core binder preferably further comprises an inorganic material selected from the group consisting of aluminosilicate and kaolin clay. Formation of the agglomerated mineral particles into cores can be accomplished as disclosed in United States Patent Publication 2004/0258835 A1 incorporated herein by reference.

The solar heat-reflective roofing granules of the present invention can be employed in the manufacture of roofing products, such as asphalt shingles and bituminous membranes, using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The near solar heat-reflective roofing granules of the present invention can be mixed with conventional roofing granules, and the granule mixture can be embedded in the surface of such bituminous roofing products using conventional methods. Alternatively, the solar heat-reflective roofing granules of the present invention can be substituted for conventional roofing granules in manufacture of bituminous roofing products.

Other functional additives, such as colorants, algaecides, biocides, or nano-$TiO_2$ can be added to the ceramic-forming material to provide additional functionalities, such as aesthetics, biocidal effects, self-cleaning, and or nitrogen oxides reduction.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Alternatively, the reverse side of the substrate sheet can be coated with an adhesive material, such as a layer of a suitable bituminous material, to render the sheet self-adhering. In this case the adhesive layer is preferably covered with a suitable release sheet.

Roofing granules are then distributed over selected portions of the top of the sheet, and the bituminous material serves as an adhesive to bind the roofing granules to the sheet when the bituminous material has cooled.

Optionally, the sheet can then be cut into conventional shingle sizes and shapes (such as one foot by three feet rectangles), slots can be cut in the shingles to provide a plurality of "tabs" for ease of installation, additional bituminous adhesive can be applied in strategic locations and covered with release paper to provide for securing successive courses of shingles during roof installation and/or aesthetic effect, and the finished shingles can be packaged. More complex methods of shingle construction can also be employed, such as building up multiple layers of sheet in selected portions of the shingle to provide an enhanced visual appearance, or to simulate other types of roofing products.

In addition, the roofing membrane can be formed into roll goods for commercial or industrial roofing applications.

Examples of suitable bituminous membranes for use in the process of the present invention include asphalt roofing membranes such as asphalt-based, self-adhering roofing base sheet available from CertainTeed Corporation, Valley Forge, Pa., for example, WinterGuard™ shingle underlayment, a base sheet which is impregnated with rubberized asphalt.

Preferably, the reinforcement material comprises a non-woven web of fibers. Preferably, the nonwoven web comprises fibers selected from the group of glass fibers, polymeric fibers and combinations thereof. Examples of suitable reinforcement material include, but are not limited to, non-woven glass fiber mats, non-woven polyester mats, composite non-woven mats of various fibers, composite woven fabrics of various fibers, industrial fabrics such as papermaker's forming fabrics and papermaker's canvasses, polymer netting, screen, and mineral particles. The fibers employed in preparing the reinforcing material can be spun, blown or formed by other processes known in the art. Yarn for forming the reinforcement material can include monofilament yarn, multi-filament yarn, spun yarn, processed yarn, textured yarn, bulked yarn, stretched yarn, crimped yarn, chenille yarn, and combinations thereof. The cross-section of the yarn employed can be circular, oval, rectangular, square, or star-shaped. The yarn can be solid, or hollow. The yarn can be formed from natural fibers such as wool and cotton; synthetic materials such as polyester, nylon, polypropylene, polyvinylidene fluoride, ethylene tetrafluroethylene copolymer, polyethylene terephthalate, polybutylene terephthalate, polytrimethylene terephthalate, poly(meth)acrylates, aramide, polyetherketone, polyethylene naphthalate, and the like, as well as non-organic materials such as spun glass fibers and metallic materials, or combinations thereof.

Non-woven glass fiber mats for use in the process of the present invention preferably have a weight per unit area of from about 40 to 150 $g/m^2$, more preferably form about 70 to 120 $g/m^2$, and still more preferably from about 80 to 100 $g/m^2$, and a thickness of from about 0.01 to 1 mm. Non-woven glass mats having a weight per unit area of about 90 g/m2 (0.018 $lb/ft^2$) are typically employed. The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

In yet another aspect of the present invention, the highly solar heat-reflective granules of the present invention can be applied to existing roofing surfaces, in the field, to provide enhance solar heat-reflectance. In this case, the highly solar heat-reflective granules are preferably dispersed in a suitable coatings binder, such as an acrylic aqueous latex material to form a curable, film-forming coating composition, or roof mastic, which can be applied to the existing roofing surface by a suitable technique, such as by spray or mopping the coating composition onto the surface, and then allowing the coating composition to dry and cure.

In order to determine the solar reflectivity of a ceramic material, two tests methods are employed. One method comprises measuring solar reflectivity using a solar spectrum reflectometer as directed by the manufacturer. Another method employs a using a UV/VIS/NIR spectrometer which calculated solar reflectivity from experimental spectra.

Figure 4:
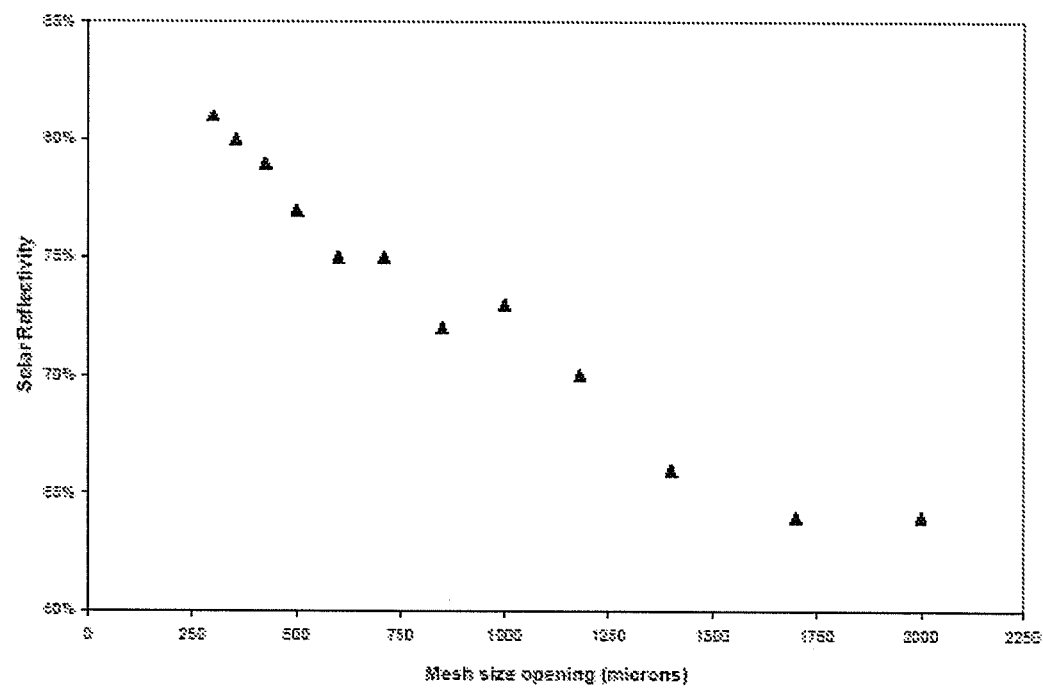
FIG. 4 is a graph showing measured solar reflectivity as a function of particle size for roofing granules prepared according to the present invention from kaolin clay.
Figure 5:
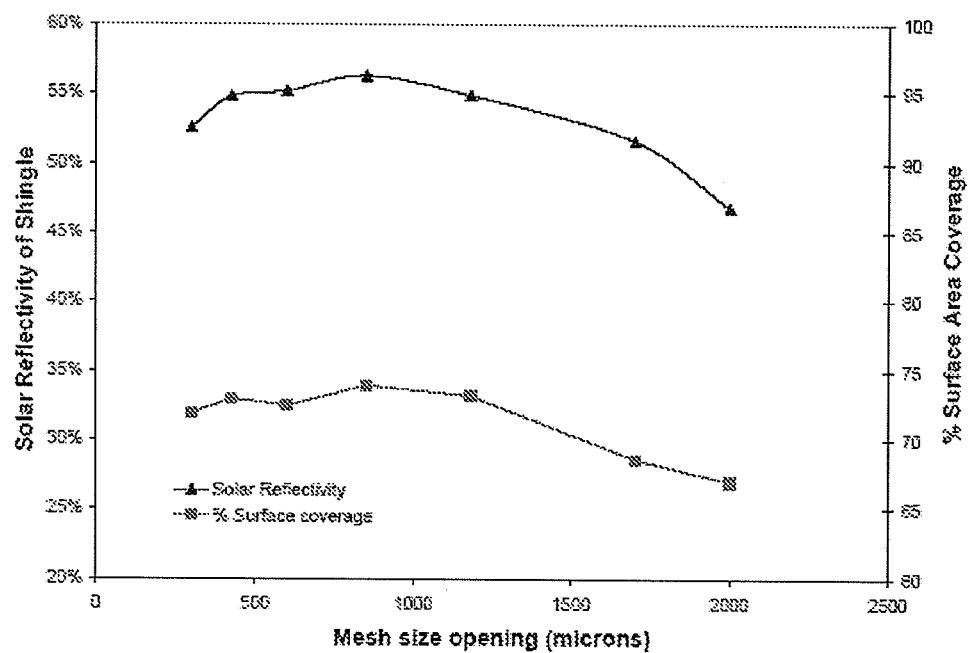
FIG. 5 is a graph showing measured solar reflectivity and percent surface area coverage as a function of particle size for roofing shingles coated with roofing granules prepared according to the present invention from kaolin clay.

The solar reflectance of granule-coated bituminous roofing materials depends upon several factors. First, the solar reflectance depends on the composition of the roofing granules coating the roofing materials. The solar reflectance of the material comprising the roofing granules can be determined by forming the material into objects having a generally flat surface, such as disc-shaped coupons. Solar reflectance tends to be reduced by surface roughness, so that a smooth surface is preferred in order to determine a reflectance value characteristic of the material itself. The solar reflectance of the roofing granules themselves can also be determined, such as by measuring the solar reflectance of the surface of loose packed granules. In this case, the solar reflectance is a function of the material from which the granules are formed, and the size, shape and surface roughness of the roofing granules. FIG. 4 is a graph showing measured solar reflectivity as a function of particle size for roofing granules prepared according to the present invention from kaolin clay, showing that solar reflectivity increases as particle size decreases. The solar reflectance of granule-coated bituminous roofing material can also be measured. In this case, the solar reflectance is a function of the material from which the granules are formed, the shape and surface roughness of the granules, and the extent to which the surface of the bituminous roofing material is covered by the granules. FIG. 5 is a graph showing measured solar reflectivity and percent surface area coverage as a function of particle size for roofing shingles coated with roofing granules prepared according to the present invention from kaolin clay.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

Example 1

Roofing shingles with high solar reflectance according to the present invention were simulated by applying particles made from sintered kaolin clays onto asphalt substrate. These sintered kaolin clay particles had specific particle sizes and solar reflectance greater than 70 percent, as shown in Table 1. The sintered kaolin clay particles are commercially available from Saint-Gobain Corp., Stow, Ohio under the trade name "LWP proppant." By blending these particles having a designed grading, one can create particle blends of various particle sizes to optimize surface coverage. Examples of various size blends are shown in Table 2. These blends were then applied onto a 1/16" thick asphalt film cast on an aluminum plate (25 mil thickness, available from Q-Panel) to simulate the shingle making process. The asphalt shingle panel was made by first casting molten asphalt (Venezuelan crude source) onto the aluminum panel substrate and pressed to a uniform 1/16" thickness film. The asphalt panel was then heated on a hot plate to a temperature below asphalt melting temperature to soften the asphalt and the particles with designed size distribution were then dropped freely onto the surface. The panel was then removed from the hot plate and the particles were pressed into the asphalt using a 20 pound steel roller while asphalt was still soft. Excess particles were shaken off from the panel and the panel was then allowed to cool to room temperature. The solar reflectance of the resultant shingle panel was measured using a solar reflectometer (model SSR available from Devices and Services Inc., Dallas, Tex.) and the color parameters were determined using a colorimeter (model Labscan XE, available from Hunter Association Laboratory, Inc., Reston, Va.) under D65 illumination and 10' observer. The results of these measurements are shown in Table 3. The results show that very high solar reflectance was achieved. The results show that a solar reflectance greater than 70 percent can be achieved by selecting a particle-size distribution to optimize surface coverage.

TABLE 1

| Particle Size, US mesh | Mean Particle Size, pm | Solar Reflectance % | L* | a' | b* |
|---|---|---|---|---|---|
| +10 mesh size | 2000 | 64 | 79.76 | 0.07 | 12.03 |
| +12 mesh size | 1700 | 64 | 80.25 | 0.27 | 11.46 |
| +14 mesh size | 1400 | 66 | 80.81 | 0.29 | 11.25 |
| +16 mesh size | 1180 | 70 | 83.04 | 0.58 | 11.94 |
| +18 mesh size | 1000 | 73 | 83.97 | 0.64 | 12.36 |
| +20 mesh size | 850 | 72 | 83.62 | 0.68 | 13.2 |
| +25 mesh size | 710 | 75 | 84.76 | 0.57 | 13.14 |
| +30 mesh size | 600 | 75 | 85.37 | 0.55 | 13.7 |
| +35 mesh size | 500 | 77 | 86.03 | 0.48 | 14.35 |
| +4O mesh size | 425 | 79 | 87.24 | 0.42 | 14.79 |
| +45 mesh size | 355 | 80 | 88.37 | 0.27 | 14.61 |
| +50 mesh size | 300 | 81 | 88.98 | 0.2 | 14.54 |

TABLE 2

| Particle size, US mesh | Particle size (um) | Blend A wt % | Blend B wt % | Blend C wt % | Blend D wt % | Blend E wt % | Blend F wt % | Blend G wt % | Blend H wt % |
|---|---|---|---|---|---|---|---|---|---|
| 10 mesh | 2000 | 0 | 0 | | | | 0 | | |
| 12 mesh | 1700 | 7 | 7 | 3 | 10 | | 2 | 1 | 0 |
| 14 mesh | 1400 | | 18 | | | | 8 | | |
| 16 mesh | 1180 | 41 | 23 | 34 | 44 | 8 | 15 | 8 | 7 |
| 18 mesh | 1000 | | 17.3 | | | | 22 | | |
| 20 mesh | 850 | 30.3 | 13 | 29 | 30 | 35 | 25 | 35 | 25 |
| 25 mesh | 710 | | 9.4 | | | | 12 | | |
| 30 mesh | 600 | 17.1 | 7.7 | 24 | 14 | 49 | 8 | 40 | 40 |
| 35 mesh | 500 | | 2.6 | | | | 4 | | |
| 40 mesh | 425 | 3.6 | 1 | 8 | 2 | 8 | 2 | 12 | 23 |
| 45 mesh | 355 | | 0.5 | | | | 1 | | |
| 50 mesh | 300 | 1 | 0.5 | 2 | 0 | | 1 | 4 | 5 |
| subtotal | | 100 | 100 | 100 | 100 | 100 | 100 | 100 | 100 |

TABLE 3

| Sample Info | Solar Reflectance | L* | a* | b* |
|---|---|---|---|---|
| shingle panel/blend A | 57.0% | 78.35 | −0.17 | 9.41 |
| shingle panel/blend B | 60.0% | 80.23 | −0.53 | 8.82 |
| shingle panel/blend C | 60.0% | 80.33 | −0.17 | 9.49 |
| shingle panel/blend D | 63.0% | 82.2 | −0.42 | 9.47 |
| shingle panel/blend E | 59.0% | 79.43 | −0.56 | 9.04 |
| shingle panel/blend F | 60.5% | 79.82 | −0.19 | 8.68 |
| shingle panel/blend 0 | 60.0% | 80.13 | −0.49 | 8.3 |
| shingle panel/blend H | 59.2% | 80.31 | −0.56 | 8.42 |

Example 2

Highly solar-heat-reflective roofing granules are made by coating crushed metamorphic rock particles (#11 grading base rock, available from CertainTeed Corp., Gads Hill, Mo.) with kaolin clay and subsequently sintered the coating at 1250° C. The coating process was carried out by first mixing 12 lb of the base rock with 109 gm of starch as dry binder in an Eirich mixer (model RVO2E, available from Eirich Corp., Gurnee, Ill.) until a uniform appearance is achieved. 365 gm of wet binder (AR animal glue) was then introduced into the mixture over an additional 2 minute period, followed by slow addition of 2 lb kaolin clay containing 0.12% starch. Mixing was continued until a uniform coating formed on the base rock. The resultant granules were then fired in a rotary kiln to a sintering temperature of 1250° C. to fuse the kaolin clay coating. Care was given in order to prevent agglomeration of the granules. The finished granules have a solar reflectance of 42% and the color reading of L*=69.09, a*=0.02, and b*=4.09.

Example 3

Roofing shingles with high solar reflectance according to the present invention were simulated by applying particles made from sintered kaolin clays onto asphalt substrate as in Example 1. Unimodal sintered kaolin clay particles with specific particle sizes were prepared by Saint-Gobain Proppants by sieving, and the particle sizes and particle-size distribution is determined using a CAMSIZER® optical particle size analyzer which is manufactured by Retsch Technology in Germany. The average particles sizes are reported in terms of US mesh size and microns in Table 3. The solar reflectance of the monodisperse particles was measured by spreading a layer of particles having a thickness of about 30 mm and using a solar reflectometer as in Example 1. The monodisperse particles were then applied onto an asphalt film cast on an aluminum plate to simulate the shingle making process as detailed in Example 1. Coverage of the asphalt film by the granules was determined by ImagePro digital image analysis using an auto bi-level setting. The solar reflectance and color parameters of the resultant shingle panel were measured as in Example 1. The results of these measurements are shown in Table 4. The results show that as the average particle size decreases the solar reflectance increases, presumably because the particles are packing more effectively to cover the surface.

TABLE 4

| Panel | Particle Size US Mesh | Particle size micron | SR particle only | SR in asphalt panel | L* | a | b* | Coverage |
|---|---|---|---|---|---|---|---|---|
| DD1-78C | 10 | 2000 | 64% | 46.8% | 72.78 | −0.04 | 8.85 | 67 |
| DD1-78D | 12 | 1700 | 64% | 51.6% | 72.98 | 0.08 | 8.57 | 68.62 |
| DD1-78E | 16 | 1180 | 70% | 54.9% | 76.68 | 0 | 8.59 | 73.19 |
| DD1-78F | 20 | 850 | 72% | 56.3% | 78.09 | −0.06 | 9.31 | 73.93 |
| DD1-78G | 30 | 600 | 75% | 55.2% | 78.04 | −0.46 | 8.59 | 72.48 |
| DD1-78H | 40 | 425 | 79% | 54.8% | 78.45 | −0.86 | 8.11 | 72.98 |
| DD1-78I | 50 | 300 | 81% | 52.6% | 78.06 | −1.04 | 6.7 | 71.92 |

Example 4

Roofing shingles with high solar reflectance according to the present invention were simulated by applying particles made from sintered kaolin clays onto asphalt substrate as in Example 1. Bimodal sintered kaolin clay particles mixtures were prepared by mixing unimodal kaolin clay particles having the particles sizes and in the weight ratio shown in Table 5. The bimodal particles were then applied onto an asphalt film cast on an aluminum plate to simulate the shingle making process as detailed in Example 1. The particle-size distribution of one sample (MS9-98D), was created to match the size distribution of a byproduct of a commercial proppant production process by sieving and mixing, as shown in Table 6.

The solar reflectance and color parameters of the resultant shingle panel were measured as in Example 1. The results of these measurements are shown in Table 5. The results show that solar reflectance can be increased by selected the components of a bimodal particle size mixture of particles, presumably because the particles can be packed more effectively to cover the surface.

TABLE 5

| Panel | Particle size | Particle size | Wt. ratio | L* | a* | b* | Solar Reflectance |
|---|---|---|---|---|---|---|---|
| MS9-98A | −18/+20 mesh | −40/+45 mesh | 66% to 34% | 80.58 | −0.6 | 8.65 | 0.587 |
| MS9-98B | −16/+18 mesh | −35/+40 mesh | 66% to 34% | 80.1 | −0.5 | 8.7 | 0.596 |
| MS9-98C | −14/+16 mesh | −30/+40 mesh | 66% to 34% | 80.23 | −0.6 | 8.81 | 0.601 |
| MS9-98D | distribution from side products | | | 81.3 | 0.41 | 9.12 | 0.611 |

TABLE 6

| Sieve (−) | Sieve(+) | Pass (wt. percent) | Retain (wt. percent) |
|---|---|---|---|
| #12 | #14 | | 0.61 |
| #14 | #16 | 100 | 11.12 |
| #16 | #18 | 99.97 | 38.3 |
| #18 | #20 | 99.23 | 33.93 |
| #20 | #25 | 90.2 | 3.02 |
| #25 | #30 | 60.49 | 0.04 |
| #30 | #35 | 32.75 | 0.55 |
| #35 | #40 | 9.67 | 3.36 |
| #40 | #45 | 1 | 5.96 |
| #45 | #50 | 0.05 | 2.19 |
| #50 | #60 | 0 | 0.53 |
| #60 | #70 | 0 | 0.09 |
| #70 | #80 | 0 | 0.01 |
| #80 | #100 | 0 | 0.01 |
| #100 | #120 | 0 | 0 |
| #120 | PAN | 0 | 0 |

Various modifications can be made in the details of the various embodiments of the processes, compositions and articles of the present invention, all within the scope and spirit of the invention and defined by the appended claims.

The invention claimed is:

1. A process for forming bituminous roofing products with high solar heat reflectance, the process comprising:
   (a) providing a ceramic-forming material comprising at least one aluminosilicate;
   (b) providing base particles comprising material thermally stable up to a temperature of at least 900 degrees Celsius;
   (c) applying the ceramic-forming material to the base particles to form a green coating layer on the base particles to form green granules;
   (d) sintering the green granules at a temperature of at least 900 degrees Celsius until the crystalline content of the coating layer of the granules is at least ten percent as determined by x-ray diffraction;
   (e) providing a bituminous roofing sheet material having an upper surface; and
   (f) applying the sintered granules in the upper surface of a bituminous roofing sheet material.

2. A process according to claim 1 wherein the sintered granules are mixed with a liquid binder composition prior to applying the sintered granules to the upper surface of the bituminous roofing sheet material.

3. A process according to claim 1, further comprising pressing the sintered granules into the upper surface of the bituminous roofing sheet material to embed the sintered granules in the upper surface of the roofing sheet material.

4. A process according to claim 1, wherein the base particles comprise a sintered ceramic material formed from at least one aluminosilicate.

5. A process according to claim 1, wherein the base particles are mineral particles selected from the group consisting of talc, slag, limestone, granite, syenite, diabase, greystone, slate, trap rock, basalt, greenstone, andesite, porphyry, and rhyolite.

6. A process according to claim 1, wherein the base particles are prepared by comminuting suitable minerals to form small particles, and agglomerating the small particles to form base particles.

7. A process according to claim 6, wherein the base particles are agglomerated by a base particle binder.

8. A process according to claim 7, wherein the base particle binder is selected from the group consisting of silicate, silica, phosphate, titanate, zirconate, and aluminate binders.

9. A process according to claim 1, wherein the base particles have an average particle size from about 0.1 mm to about 2 mm.

10. A process according to claim 1, wherein the base particles are selected from two different size classes, wherein the ceramic-forming material is applied to each class of base particles to form at least two different classes of green granules, each class of green granule being characterized by a different predetermined average particle size, the green granules being sintered to provide at least two size classes of sintered granules.

11. A process according to claim 1 further comprising selected sintered granules from at least two different classes prior to applying the sintered granules in the upper surface of the bituminous roofing sheet material, the sintered granules being selected to provide a predetermined surface coverage of the bituminous sheet material.

12. A process for forming bituminous roofing products with high solar heat reflectance, the process comprising:
   (a) providing a ceramic-forming material comprising at least one aluminosilicate;
   (b) forming the ceramic-forming material into green granules;
   (c) sintering the green granules at a temperature of at least 900 degrees Celsius until the crystalline content of the sintered granules is at least ten percent as determined by x-ray diffraction;

(d) providing a matrix material for securing the sintered granules;

(e) forming a solar reflective sheet comprising sintered granules and matrix material;

(f) providing a bituminous roofing sheet material with an upper surface; and (g) applying the solar reflective sheet to the upper surface of a bituminous roofing sheet material;

(h) applying the solar reflective sheet to the upper surface of a bituminous roofing sheet material.

13. A process according to claim 1, wherein the green coating layer on the base particles has a thickness in the range of 1 micrometer to 300 micrometers.

14. A process according to claim 1, wherein the at least one aluminosilicate comprises kaolin clay or bauxite.

15. A process according to claim 12, wherein the ceramic-forming material is formed into green granules by mixing the ceramic-forming material with a liquid to form a mixture, the mixture being formed into pellets, and the pellets being screened to provide green granules.

16. A process according to claim 12, wherein the ceramic-forming material is formed into green granules having a predetermined particle size distribution.

17. A process according to claim 12 wherein the ceramic-forming material is formed into spherical green granules.

18. A process according to claim 12 wherein the ceramic-forming material is formed into plate-like green granules.

19. A process according to claim 12 wherein the matrix material is a liquid binder selected from the group consisting of acrylic emulsions, latex, thermoplastic polymers, fluoropolymer emulsions, epoxies, UV or radiation curable resins, alkaline metal silicates, sol-gel solutions, silicone resins, silica binders, and combinations thereof.

20. A process according to claim 12, wherein the at least one aluminosilicate comprises kaolin clay or bauxite.

* * * * *